US007275062B2

(12) United States Patent  (10) Patent No.: US 7,275,062 B2
Deitz et al.  (45) Date of Patent: Sep. 25, 2007

(54) AUTOMATIC LINKAGE OF PROCESS EVENT DATA TO A DATA HISTORIAN

(75) Inventors: David Deitz, Austin, TX (US); Will Irwin, Austin, TX (US); Grant Wilson, Austin, TX (US); Beth Filippo, Manchaca, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 10/385,310

(22) Filed: Mar. 10, 2003

(65) Prior Publication Data
US 2004/0181294 A1  Sep. 16, 2004

(51) Int. Cl.
G06F 7/00 (2006.01)
G06F 17/00 (2006.01)
G05B 11/01 (2006.01)

(52) U.S. Cl. ............. 707/102; 707/10; 700/17; 700/19; 700/20

(58) Field of Classification Search .......... 700/2, 700/4, 9, 10, 17, 19, 20, 108, 121; 702/127, 702/182, 183, 185; 707/10, 102
See application file for complete search history.

(56) References Cited

U.S. PATENT DOCUMENTS

| 4,007,450 A | 2/1977 | Haibt et al. |
| 4,718,025 A | 1/1988 | Minor et al. |
| 4,888,726 A | 12/1989 | Struger et al. |
| 5,226,118 A | 7/1993 | Baker et al. |
| 5,257,206 A | 10/1993 | Hanson |
| 5,440,478 A | 8/1995 | Fisher et al. |
| 5,611,059 A * | 3/1997 | Benton et al. ............. 715/734 |
| 5,768,148 A | 6/1998 | Murphy et al. |
| 5,892,938 A * | 4/1999 | Eastty et al. ............. 710/8 |

(Continued)

FOREIGN PATENT DOCUMENTS

EP  0434050 A2  6/1991

(Continued)

OTHER PUBLICATIONS

Search Report under Section 17 issued in GB 9921599.8 application by the United Kingdom Patent Office on Dec. 6, 1999.

(Continued)

*Primary Examiner*—Crystal J. Barnes
(74) *Attorney, Agent, or Firm*—Marshall Gerstein & Borun LLP

(57) ABSTRACT

A configuration system for a process plant includes a routine that automatically provides an indication of the relationships between units and sub-elements of the units, such as equipment and control modules, present within a process plant to a data historian. The data historian, which may be a batch historian, stores these relationships in a configuration file or a database, collects events generated within the process plant and associates those events to the proper unit within the process plant using the stored relationships. The automatic updating of the data historian configuration file eliminates the need for a user to manually update the data historian with these relationships, either at the time the process plant is configured or each time a change is made to the configuration of the process plant.

21 Claims, 3 Drawing Sheets

U.S. PATENT DOCUMENTS

| | | | |
|---|---|---|---|
| 6,229,536 B1 | 5/2001 | Alexander et al. | |
| 6,263,487 B1 | 7/2001 | Stripf et al. | |
| 6,449,624 B1 * | 9/2002 | Hammack et al. | 707/203 |
| 6,477,435 B1 * | 11/2002 | Ryan et al. | 700/86 |
| 6,643,555 B1 * | 11/2003 | Eller et al. | 700/83 |
| 6,687,698 B1 * | 2/2004 | Nixon et al. | 707/10 |
| 6,754,885 B1 * | 6/2004 | Dardinski et al. | 717/113 |
| 6,847,850 B2 * | 1/2005 | Grumelart | 700/37 |
| 6,975,966 B2 * | 12/2005 | Scott et al. | 702/183 |
| 7,043,311 B2 * | 5/2006 | Nixon et al. | 700/83 |
| 7,076,312 B2 * | 7/2006 | Law et al. | 700/23 |
| 7,117,052 B2 * | 10/2006 | Lucas et al. | 700/83 |
| 7,127,460 B2 * | 10/2006 | Nixon et al. | 707/8 |
| 2003/0041135 A1 * | 2/2003 | Keyes et al. | |
| 2004/0139079 A1 * | 7/2004 | Eryurek et al. | |

FOREIGN PATENT DOCUMENTS

| | | |
|---|---|---|
| EP | 0 508 386 A3 | 10/1992 |
| EP | 0508386 A2 | 10/1992 |
| GB | 2329726 A | 3/1999 |
| GB | 2347234 | 8/2000 |
| GB | 2363871 | 1/2002 |
| WO | WO-9726587 | 7/1997 |

OTHER PUBLICATIONS

Search and Examination Report under Sections 17 & 18(3) issued in GB 0405238.7 application by the United Kingdom Patent Office on Aug. 2, 2004.

Realtime Operating Systems For Distributed Process Control Systems by James D Schoeffler at Proceedings of the 6$^{th}$ Triennial World Congress of the International Federation of Automatic Control, Boston and Cambridge, MA, USA, Aug. 24-30, 1975. 27.3 pp. 1-14. See also Abstract with INSPEC Accession No. 1018109.

* cited by examiner

AUTOMATIC LINKAGE OF PROCESS EVENT DATA TO A DATA HISTORIAN

TECHNICAL FIELD

This patent relates generally to process plants and, more particularly, to the use of a configuration application that automatically notifies a data historian, such as a batch historian, of the relationships between higher level and lower level entities within the process plant configuration.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known FOUNDATION® Fieldbus protocol may also perform control calculations, alarming functions, and other control functions commonly implemented within the controller. The process controllers, which are also typically located within the sometimes harsh plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process plant.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, generating reports on the activity and operation of sections or units within the process plant, etc.

As an example, the DeltaV™ control system, sold by Fisher-Rosemount Systems, Inc. includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. The configuration application may also enable a user to specify specific relationships between control modules and other higher level entities within the process plant, such as equipment and units for which the control modules are to be executed.

Each dedicated controller and, in some cases, field device, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, historians in general and batch historians in particular collect data associated with different entities within the process plant and store that data in a manner that is easily retrieved by a user to view a historical log of changes to and activity performed by the different entities in a process plant. More particularly, data historians, such as batch historians, typically collect and store data on a unit by unit basis, and may collect and store data associated with changes made to a unit by operators, the performance of batches run on a unit, etc. Moreover, batch historians generally collect event data, such as alarms and other event signals, generated within a process plant and store these signals to thereby record significant events detected in process entities within the process plant, such as overflow or underflow conditions, degradation or loss of communications within the process plant, etc. This data is typically directed to a unit or from a unit within the process plant using electronic signals and this data is easily identified as such by the address or other information within the signals sent to or from the unit. While much of this data is unit specific and can be identified by the batch historian as such, event signals (with alarms being a particular type of event signals) are typically generated on a module by module basis within the process plant. That is, control modules run within a controller or, in some instances, within field devices or other devices within the process plant generate the event signals and send these event signals to a user workstation for display to a user without specifying a higher level entity to which the module generating the event signal belongs. Because event signals are module specific, the batch historian needs to know what higher level entity, such as what unit, owns the module that generated the event signal.

While there is generally a relationship between higher level entities, such as units, and lower level entities, such as equipment and control modules, this relationship is specified or configured by a configuration system when the process control system is created. The process control system configuration can be changed throughout the use of a process plant when new or different control modules and equipment entities are added to the process plant and new or changed control modules are downloaded to controllers or other devices within the process plant. However, because a data historian is typically supplied as a third party package, it generally has no information about the lower level equipment or control modules that are associated with a particular unit unless the unit/equipment and instrumentation relationships have been specifically configured as part of the historian configuration. Thus, unfortunately, the data historian and, in particular, a batch historian, within the process plant is generally unaware of the relationships between the units for which it is collecting data and the modules within the process plant which are generating event signals. As a result, the data historian is frequently unable to relate events that are generated within the process plant with the units in which these detected events are occurring, resulting in an incomplete picture of a unit history and in an unorganized record of events for the process plant. Still further, it is important for the accurate collection of event (e.g., alarm) data for the data historian to know which events and alarms are related to which units because, in batch processes, the alarms and events are of relevance only when they are generated on a unit on which a batch is actually being run. More particularly, it is desirable for the batch historian to ignore event signals associated with units for which no batch is running but to collect and store the event signal associated with units on which a batch is currently running. This collection is impossible, however, if the unit/equipment/ module relationships are not known to the batch historian.

In the past, a configuration engineer or other person could manually instruct the batch historian of the relationships between the higher level entities, such as units, and the lower level entities, such as equipment entities and control modules, within the process plant so that the data historian could relate the collected event data to the units within the process plant. At the initial configuration of the process control system, however, this configuration effort could be overwhelming as it is not unusual for a unit to have hundreds of unit/equipment/control module relationships and for a plant to have hundreds of units. Importantly, this batch historian configuration activity was frequently not performed at all, as it required an extra step that the configuration engineer had to perform. Furthermore, even if this configuration information was initially provided to the batch historian by the configuration engineer, the batch historian configuration database had to be changed each and every time a configuration change occurred that altered these relationships, which was tedious to the configuration engineer. Also, because configuration changes can occur quite often in a process plant, the failure to correctly update the batch historian with each configuration change in every instance resulted in the configuration between units, equipment and control modules as stored in a data historian becoming quickly uncorrelated or mismatched with respect to the actual configuration between these entities within a process plant, resulting in inaccurate reports being generated by the batch historian.

SUMMARY

A configuration system for a process plant includes a routine that automatically provides an indication of the relationships between higher level entities, such as units, and lower level entities, such as equipment and control modules, within a process plant to a data historian, such as a batch historian. The data historian stores and uses these relationships to collect events generated within the process plant and to associate those events with the proper higher level entity within the process plant. The automatic nature of updating the configuration information within the data historian by the configuration application eliminates the need for a user to manually update the data historian with these relationships, either at the time the process plant is configured or each time a change is made to the configuration of the process plant. This fact, in turn, leads to a more accurate and informative reports being generated by the data historian.

DETAILED DESCRIPTION

Figure 1:
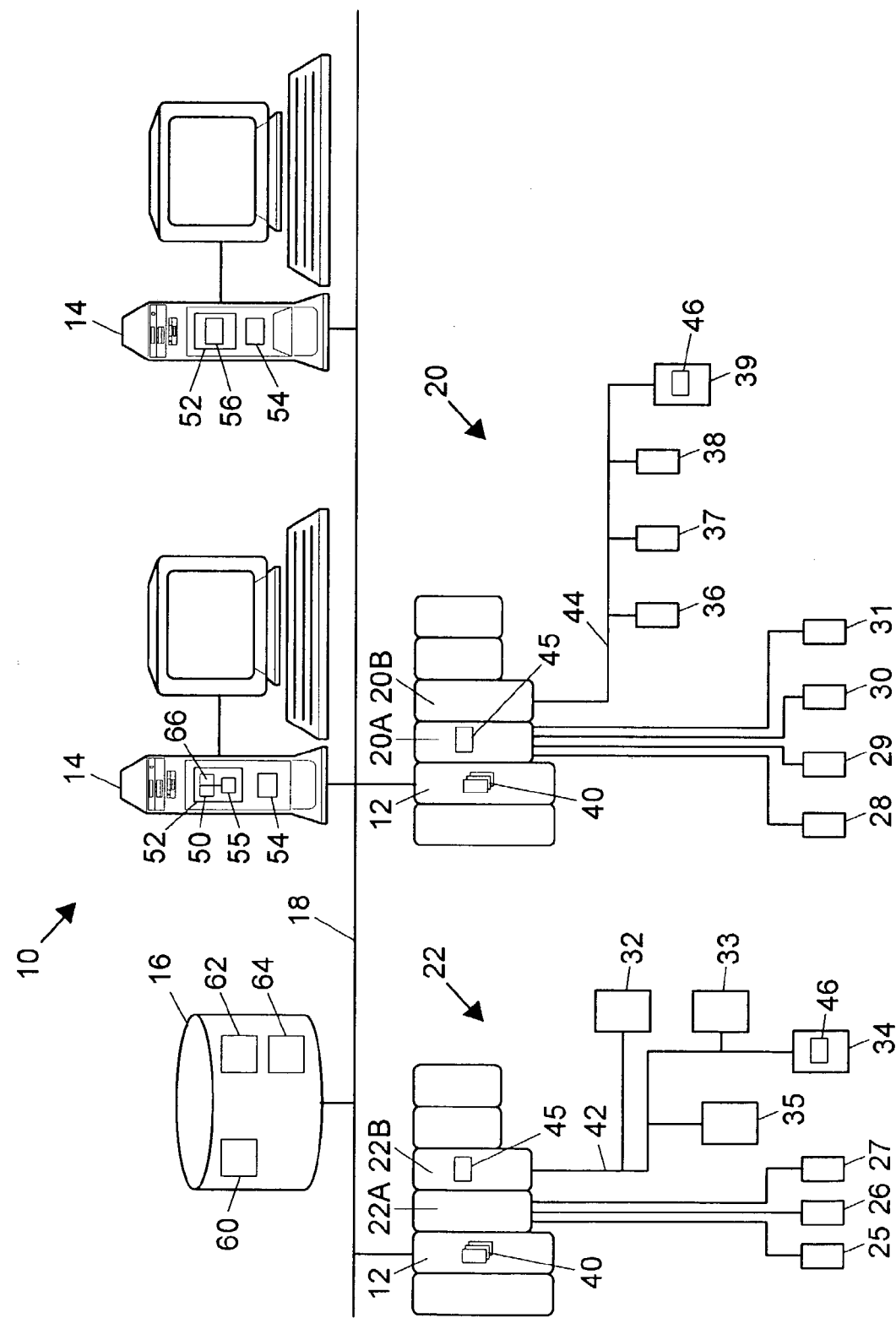
FIG. 1 is a block diagram of a distributed process control network located within a process plant, including a data historian and an operator workstation that implements a configuration application.

Referring now to FIG. 1, a process control network or system 10 includes one or more process controllers 12 connected to one or more host workstations or computers 14 (which may be any type of personal computer, workstation or other computer) and to a data historian 16 via a communication connection 18. The communication connection 18 may be, for example, an Ethernet communication network or any other desired type of private or public communication network. Each of the controllers 12 is connected to one or more input/output (I/O) devices 20, 22 each of which, in turn, is connected to one or more field devices 25-39. While two controllers 12 are illustrated in FIG. 1 as connected to fifteen field devices, the process control system 10 could include any other number of controllers and any desired number and types of field devices. Of course, the controllers 12 are communicatively connected to the field devices 25-39 using any desired hardware and software associated with, for example, standard 4-20 ma devices and/or any smart communication protocol such as the Fieldbus or HART protocols. As is generally known, the controllers 12, which may be, by way of example only, DeltaV™ controllers sold by Fisher-Rosemount Systems, Inc., implement or oversee process control routines or control modules 40 stored therein or otherwise associated therewith and communicate with the devices 25-39 to control a process in any desired manner.

The field devices 25-39 may be any types of devices, such as sensors, valves, transmitters, positioners, etc. while the I/O cards 20 and 22 may be any types of I/O devices conforming to any desired communication or controller protocol such as HART, Fieldbus, Profibus, etc. In the embodiment illustrated in FIG. 1, the field devices 25-27 are standard 4-20 ma devices that communicate over analog lines to the I/O card 22A. The field devices 28-31 are illustrated as HART devices connected to a HART compatible I/O device 20A. Similarly, the field devices 32-39 are smart devices, such as Fieldbus field devices, that communicate over digital bus 42 or 44 to the I/O cards 20B or 22B using, for example, Fieldbus protocol communications. Of course, the field devices 25-39 and the I/O cards 20 and 22 could conform to any other desired standard(s) or protocols besides the 4-20 ma, HART or Fieldbus protocols, including any standards or protocols developed in the future. As will be understood, each of the field devices 25-39 is typically associated with or is part of equipment within one or more specified units within the process plant. In a similar manner, each of the controllers 12 implements control modules 40 associated with one or more units or other entities, such as area, within the process plant to perform operations on those units, areas, etc. In some cases, parts of the control modules may be located in and executed by the I/O devices 22 or 20 and the field devices 25-39. This is particularly the case with FOUNDATION® Fieldbus field devices 32-39. Modules or portions of modules 45 are illustrated as being located in the I/O cards 20A, 22B and modules or portions of modules 46 are illustrated as being located in the field devices 34 and 39.

Typically, each of the modules 40, 45 and 46 is made up on one or more interconnected function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Both function blocks and modules may be stored in and executed by the controllers 12, which is typically the case when these function blocks are used for, or are associated with standard 4-20 ma devices and some types of smart field devices, or may be stored in and implemented by the field devices themselves, which may be the case with FOUNDATION® Fieldbus devices. While the description of the control system 10 is provided herein using function block control strategy, the control strategy could also be implemented or designed using other conventions, such as ladder logic, sequential flow charts, etc. and using any desired proprietary or non-proprietary programming language.

In the system 10 of FIG. 1, one or more of the host devices 14 serves as an operator workstation and includes configuration software 50 that is stored in a memory 52 and that is adapted to be executed on a processor 54 of the workstation 14. Of course the processor 54 may be any desired type of processor and the memory 52 may be any desired type of computer readable memory, including RAM, ROM, memory on a hard drive or a magnetic or optical storage medium, a dedicated memory or a transportable memory, such as a magnetic or optical disc, etc. Still further, the processor 54 and the memory 52 may be combined in, for example, an ASIC or firmware configuration. Generally speaking, the configuration software 50 enables a configuration engineer to perform configuration activities within the process plant including creating and specifying control modules to be downloaded to the controllers 12, the I/O devices 20 and 22 and the field devices 25-39 to control units or other equipment within the process control system 10. As part of these configuration activities, the configuration engineer or other user specifies the specific relationships between higher level entities within the process plant, such as units, and lower level entities within the process plant, such as equipment and control modules associated with each of the units. After the control modules are created for and associated with each of units, these control modules can be downloaded to the controllers 12 and, if necessary, to the I/O devices 20, 22 and to the field devices 25-39, and may be implemented thereon to control the operation of the process. Still further, at some point within the configuration activity, the configuration engineer will save the current configuration of the process control system 10 in a configuration database 55 which may be stored in, for example, one of the workstations 14.

If the process is a batch process, a batch executive routine 56 (illustrated as being stored in a different one of the workstations 14) may be used to run batches using different recipes on particular units within the process control system 10 at different times. During operation, the batch executive routine 56 may reserve certain units within the process control system 10, and may provide recipe and other operator generated information to the control modules 40, 45 and 46 within the controllers 12, the I/O devices 20, 22 and the field devices 25-39 to implement one or more phases of a batch process. The batch executive 56 may also monitor these phases until completed. Of course, during this time, the control modules 40, 45 and 46 will detect events, such as significant problems like alarms, or less serious problems, like warnings or notifications, based on the operation of the process and will send event signal to one or more of the operator workstations 14 where these events (e.g., alarms) are displayed to an operator or maintenance person who may, if necessary, take actions to alleviate the condition(s) giving rise to the events. Of course, during operation, a process operator, such as a batch operator, may provide changes to the batch executive routine 56 by providing new batches to run, new recipes, changes to existing batch runs and recipes, etc.

As is known, the data historian 16 includes a processor 60 and a memory 62 that stores programming or routines to be run on the processor 60 to monitor data or messages on the communication network 18. These routines monitor changes made to the batch runs or modules within the process plant by an operator or other user via any one of the workstations 14, as well as events generated by any of the modules 40, 45 and 46 or any of the devices 12, 20, 22 or 25-39. These monitoring routines store the collected information in a manner that can be retrieved at a later time to, for example, produce a report of the past operation of the different elements and, in particular, the different units within the process control system 10. The data collected by the data historian 16 can be any data that is generated at the operator workstations 14, such as changes in setpoints in units, or other control data sent by an operator making changes to equipment or control modules within the process plant or data generated by the control modules within the process plant, including event data, such as alarms. To enable the data historian 16 to function properly to be able to associate data received from within the process plant, the data historian 16 includes a configuration memory or list 64 that indicates the relationships between different higher level entities, such as units, and lower level entities, such as equipment and control modules, as those relationships are specified or stored within the configuration database 55. The data historian 16 uses this configuration information to associate the data received from the workstations 14 or the control modules 40, 45, and 46 with the proper higher level entity, such as with the proper unit, so that the data historian 16 can keep track of information, such as changes made to or events associated with each of the different higher level entities within the process plant. Furthermore, the data historian 16 may use this configuration information to determine if alarms or events generated within the process plant are being generated by a unit that is actually currently running or is in operation as part of a batch process and therefore are relevant to the operational status of the unit or if, instead, these events are associated with an inactive unit and therefore not relevant to the operational status of the unit.

In the past, a user had to manually provide the configuration information stored in the configuration memory 64 specifying the parts or sub-elements of each unit within the process plant so that the batch historian 16 could operate properly to store accurate and complete data about each of the higher level entities, such as units, within the process plant. However, this task could very time consuming and fraught with operator introduced errors as mistakes in specifying the actual manner in which the process control system 10 was configured could be made in the configuration information sent to the data historian 16. Furthermore, each time a configuration change was made to the process control system 10, such as by adding, deleting or changing control modules or equipment associated with units, a user had to manually provide this information to the data historian 16. If the user forgot or failed to notify the data historian 16 of these changes, the data stored in or reported by the data historian 16 could become incomplete or faulty.

To overcome these problems, the configuration application 50 of FIG. 1 includes a data historian update routine 66 which automatically informs the data historian 16 of the relationships between higher level entities, such as units, and lower level entities, such as equipment and modules within the process control network configuration at, for example, the time that control modules are created and downloaded to the controllers 12, the I/O devices 20 and 22 or the field devices 25-39. In particular, the routine 66 may detect changes made to the configuration of any and each unit within the process plant as stored in the configuration database 55. When these changes are made, such as by an operator, a configuration engineer, or any other authorized user, the routine 66 may provide a new configuration list or may provide changes to be made to the configuration list 64 stored within the data historian 16. Of course, the routine 66 will provide this new configuration list or changes to the configuration list 64 via the communication network 18, but could, alternatively provide this information in any other desired manner, such as via a different shared or dedicated communication network. In instances in which the configuration database 55 is stored in the same device as the data historian 16, such as the same server or database, then the routine 66 may provide such changes directly without using an external communication network.

Of course, the new configuration information may be provided as a result of any significant event associated with changing the configuration of the process control system 10, including for example the creation of changes by the user, the downloading of changes or new control modules 40, 45, 46 to the controllers 12 or other devices or any other desired event, as long as the routine 66 operates automatically and consistently to send configuration changes to the data historian 16 each time a configuration change is made that alters or effects the information or relationships stored in the data historian configuration memory 64.

Of course, during operation, the data historian 16 will monitor the information sent from the modules 40, 45 and 46 which may include the relevant values, settings and measurements associated with or being made in the process plant and will then use the configuration list 64 to determine the higher level entity to which this data belong or is associated. In one particular case, the data historian 16 is programmed to receive alarms created by alarm generating software within some or all of the controllers 12, the I/O devices 20 and 22 or the field devices 25-39. Generally speaking, the data historian 16 may receive and store different categories of events and alarms including, for example, process alarms (which are typically generated by a process control software modules, such as those made up of communicatively interconnected function blocks, forming process control routines used during runtime of the process), hardware alarms, such as alarms generated by the controllers 12, I/O devices 20 and 22 or other devices, pertaining to the state or functioning condition of these devices, and device alarms, which are generated by some or all of the field devices 25-39 to indicate problems associated with those devices. These or other categories of alarms may be generated in any desired manner and any desired error detection and alarm generating software may be used to send alarms to the data historian 16, which is configured to receive and recognize these alarms using any desired protocol or communication strategy. Of course, the alarms or events may include any desired information associated with the event, such as the category of the event (e.g., process, device or hardware alarm), the type of event (communication, failure, advisory, maintenance, etc.), the priority of the event, the module, device, hardware, node or area to which the event pertains, whether the event has been acknowledged or suppressed, whether the event is active, etc.

Figure 2:
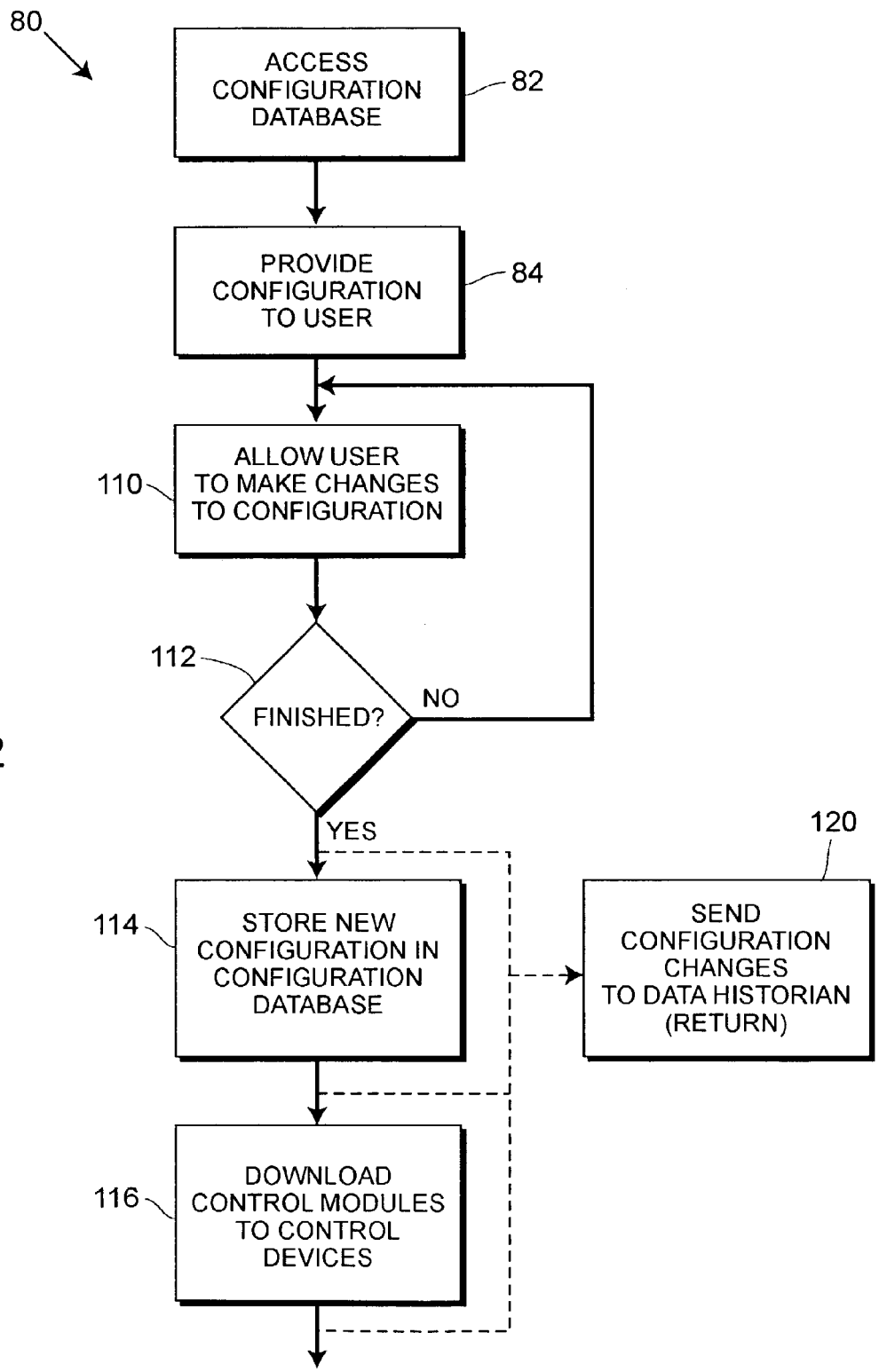
FIG. 2 is a flow chart illustrating a portion of a configuration application that automatically provides configuration information to a data historian at the time the configuration is created or is downloaded to controllers within the process plant.
Figure 3:
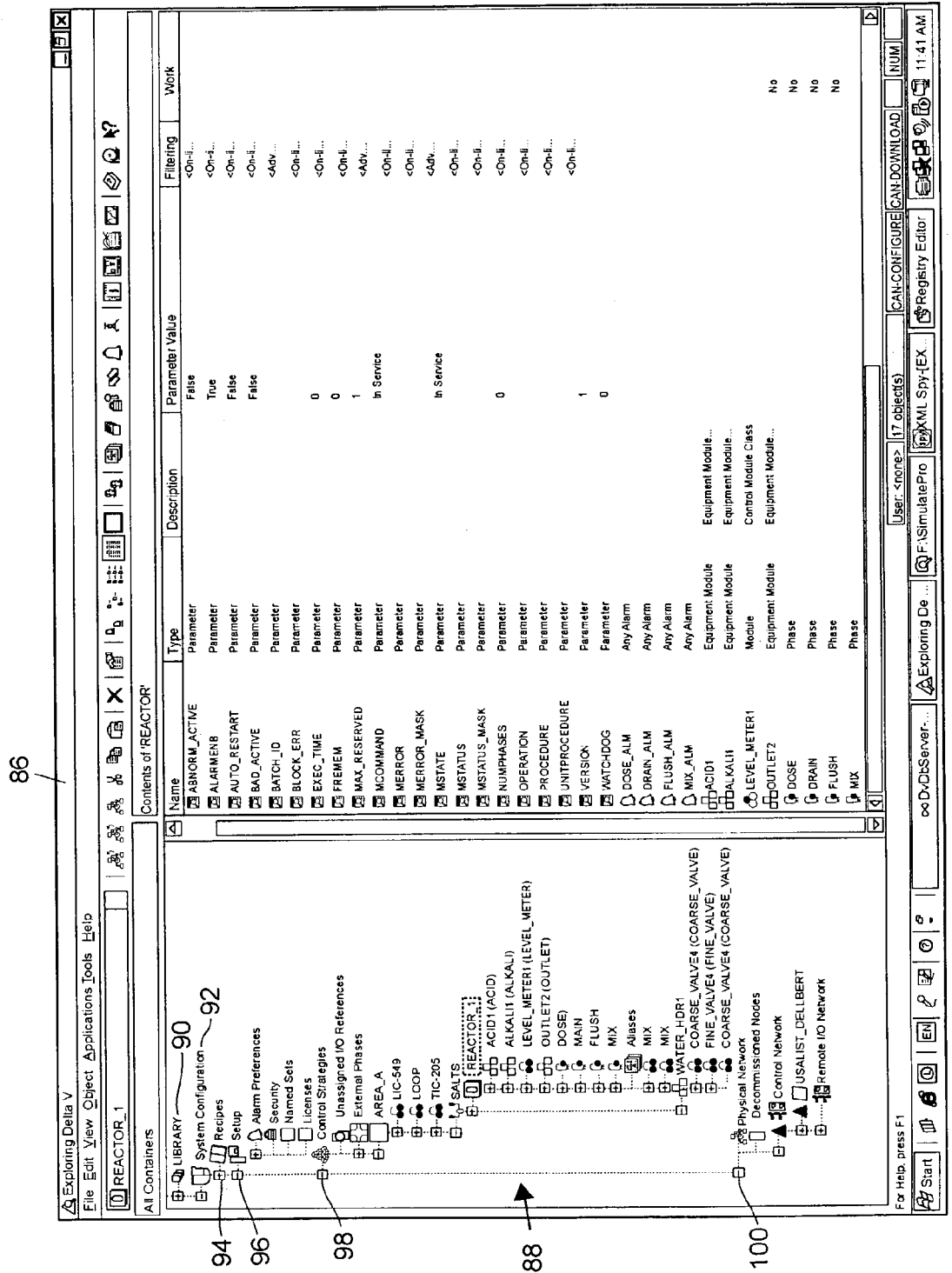
FIG. 3 is a depiction of a configuration screen which may be produced by the configuration application of FIG. 2 to enable a configuration engineer to configure the relationships between higher level entities and lower level entities within a process plant.

Referring now to FIG. 2, a flow chart 80 illustrates the general steps that may be taken by the configuration application 50 to automatically provide configuration changes in the form of relationships between higher level entities, such as units, and lower level entities, such as equipment and control modules, to the data historian 16. At a step 82, the configuration application 50 accesses the configuration database 55 to obtain the current configuration of the process control system 10. At a step 84, the configuration application 50 presents the configuration of the process control system 10 to a user, such as a configuration engineer, an operator, etc. via, for example, a display screen associated with one of the workstations 14 of FIG. 1. An example of a configuration display screen 86 that may be created at the step 84 is illustrated in FIG. 3. The configuration display screen 86 includes an explorer-type view 88 on the left-hand side thereof, and displays more particular information about a selected element within the view 88 (in this case, the element Reactor_1) on the right-hand side thereof. The view 88 includes general configuration elements, such as a Library section 90 and a System Configuration section 92. The Library section 90 stores templates, such as template control modules, equipment and units, etc. and other useful generic elements, while the System Configuration section 92 includes a Recipes folder 94 which stores recipes for batch runs, a Setup folder 96 which stores set up parameters for the configuration, such as alarm preferences, security, etc., a Control Strategies folder 98 which stores configuration information about the manner in which control is implemented within the process plant and a Physical Network folder 100 which stores configuration information pertaining to the manner in which the process control system 10 is physically configured.

As will be understood, the Control Strategies section 98 defines or includes relationships between higher level entities and lower level entities used to control the process plant. For example, the Control Strategies section 98 includes and area designation Area_A (which may be considered a higher level entity) which has sub-elements associated therewith including control loops named LIC-549, LOOP, and TIC-205 that are run in the Area_A. Moreover Area_A includes a Salts manufacturing section or process cell which may have one or more sub-elements. In this case, the Salts manufacturing section or process cell includes a Reactor_1 unit entity and a $Water_{13}$ Hdr1 equipment entity as sub-elements thereof. While these two entities are lower level entities with respect to the Salts manufacturing section or process cell, they are higher level entities with respect to other elements associated therewith. For example, the Reactor_1 unit includes lower level entities named Acid1, Alkali1, and an Outlet2, which are equipment entities that form parts of the Reactor_1 unit. Likewise, the Reactor_1 unit includes control modules named Level_Meter1, Water_Hdr1 and Water_In1 which perform control routines or activities with respect to the Reactor_1 unit. Still further, the Reactor_1 unit includes sub-elements in the form of phases to be run on the Reactor_1 unit named Dose, Drain, Flush and Mix.

In a similar manner, the Water_Hdr1 equipment entity of the Salts manufacturing section includes sub-elements (lower-level elements) such as control modules named Coarse_Valve4, Fine_Valve4 and Flow_Meter4. While the configuration view 88 of FIG. 3 illustrates the relationships between particular areas (e.g., Area_A), units (e.g., Reactor_1), equipment entities (e.g., Acid1, Alkali1, $Water_{13}$ Hdr1) and control modules (e.g., Level_Meter1, Water_In1, Coarse_Valve4), it will be understood that other relationships between these types or other types of entities may be specified in the configuration view 88 and that the view 88 of FIG. 3 is merely exemplary in nature.

Referring again to FIG. 2, at a step 110, the configuration application 50 enables a user to make changes to the configuration using, for example, the screen display 86 or any other desired method of making configuration changes. Generally speaking, the configuration application 50 provides configuration information to a configuration engineer and enables the configuration engineer to configure some or all elements of the process plant in any desired manner. As a result of the configuration activities performed by the configuration application 50, the configuration engineer may create or change the control routines or control modules 40, 45, 46 for the process controllers 12, I/O devices 20, 22 and the field devices 25-39, may specify equipment and units on which these control routines are to be implemented and may, in general, specify the relationships between higher level entities and lower level entities within the process control system 10.

If desired, control modules can be created and assigned to each of the different controllers 12 and other devices using the method for configuring a process control system as described in U.S. Pat. No. 5,838,563 which is assigned to the assignee of this patent and which is hereby expressly incorporated by reference herein. Generally speaking, control modules can be created from module template objects stored in the configuration Library section 90 of FIG. 3 and can be adapted so as to be used in a particular controller or other device to perform specific control functions with respect to particular equipment, units, areas or other higher level entities within the process control system 10. To create a control module, equipment, unit, etc. within the configuration system, a configuration engineer may copy a particular template to create a particular individual element and may assign that individual element to a particular entity, such as a higher level entity like a unit, by dragging and dropping that particular template to the appropriate section or place within the view 88 of the configuration display screen 86 of FIG. 3.

Thus, for example, to configure the salt manufacturing section of the process plant using the configuration display screen 86 of FIG. 3, a configuration engineer may select a reactor unit template object (not shown) from the Library section 90 and drag or otherwise copy it under the Salts heading to create an instance of a reactor as being associated with the salts manufacturing section named Salts (which is associated with the area named Area_A). The configuration engineer may also select an equipment template of appropriate form and drag it under the Reactor_1 unit to create the Acid 1 equipment module, the Alkali1 equipment module, etc. to thereby specify equipment associated with the higher level Reactor_1 unit. In a similar manner, the configuration engineer may select a control module template and drag it under the Reactor_1 unit to create the Water_In1 control module, etc. to thereby specify control modules associated with the higher level Reactor_1 unit. Of course, the configuration engineer may specify any desired relationships between areas, units, equipment, control modules, and any other designations of different entities within the process plant. Moreover, any other manner of making or changing a configuration to specify relationships between higher level entities and lower level entities within the process control system 10 may be used as well or instead of that generally described herein.

At a step 112 in FIG. 2, the configuration application 50 determines if the configuration engineer or other user is finished making changes to the configuration of the process plant. If not, control is returned to the step 110. However, if the configuration engineer or other user is finished making changes, at a step 114, the configuration application 50 stores these changes in the configuration database 55 and, at a step 116, the configuration application 50 downloads the changes, such as the new or altered control modules to the controllers 12 or other devices in which these control modules are to be executed. At a step 120, which may automatically implemented as a result of, or which may be a subroutine called by any of the steps 112, 114, or 116, the configuration application 50 and, in particular, the configuration routine 66 provides or sends the configuration changes to the data historian 16 to update the configuration list or memory 64. Of course, the step 120 may be implemented or called as a result of any other step or act associated with making changes to the configuration of the process control system 10.

While there are many different possible types entities that can be created or used within a process plant to perform configuration activities within the process plant, three specific types are discussed herein as examples, including unit, equipment and control module entities. Generally speaking, each different type of entity is associated with a different scope of control or use within the process plant and these entities are generally understood in the context as they are defined in the well-known S88 standard.

More particularly, a unit is intended to be used to represent control activities for a broad scope of equipment within a process plant. In particular, a unit is associated with or intended to model an inter-related set of equipment such as, for example, reactors or other elements that have individual elements that work in concert with one another in some known manner.

An equipment entity is intended to be used to represent control activities for a less broad scope of physical equipment within the process plant. The equipment associated with an equipment entity is generally one or more physical entities, such as valves, flow meters, etc. that make up a subsystem of a unit and the equipment entity may include one or more commands or algorithms, which may be command driven algorithms (CDAs) or state driven algorithms (SDAs), to be performed on the piece of equipment. Thus, an equipment entity is aimed at configuring the control of one or more low level components or entities within a unit to provide a basic set of functions on that equipment as used within the unit. As is known, a command driven algorithm is used when the low level components must be coordinated through multiple steps to accomplish a function. For example, a valve may need to be opened for a particular amount of time and then closed while another valve is opened and then closed. A state driven algorithm may specify the states of different low-level components which can be manipulated in a single step.

A control module entity is intended to be used and to represent individual control elements or control modules within the process plant. A control module provides or specifies a particular type of control to be performed on a plant entity, such as a valve, meter, etc., a piece of equipment or even on a unit. Generally speaking, a control module provides a particular type of control programming, such as a set of communicatively interconnected function blocks defining some control routine to be executed in a controller or other device, useful to perform one or more control activities within a process plant.

While the configuration application 50 is described herein as specifying the relationships between these three particular types of entities and providing changes in these relationships to the data historian 16, which may be a batch historian, the configuration application 50 may automatically provide the relationships between any other high and low level entities (besides units, equipment and control modules) to the data historian 16 to enable the data historian 16 to interpret and store the data related to events within the process control system 10 in an accurate and meaningful manner. In this manner, any desired configuration information may be automatically sent from the configuration application 50 to the data historian 16 to enable the data historian 16 to operate in a better or more meaningful manner.

When implemented, any of the software described herein may be stored in any computer readable memory such as on a magnetic disk, an optical disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration system for use in a process control system including one or more controllers and a data historian coupled to a workstation having a processor, the configuration system comprising:
   a computer readable memory;
   a first configuration routine stored on the computer readable memory and adapted to be executed on the processor to display a configuration of the process control system to a user and to enable the user to specify relationships between one or more sub-elements associated with one or more higher level elements within the configuration of the process control system, and to download changes to the configuration of the process control system to the controllers; and
   a second configuration routine stored on the computer readable memory and adapted to be executed on the processor to automatically provide information pertaining to the one or more sub-elements associated with the one or more higher level elements to the data historian for use by the data historian in storing process data generated during operation of the process control system.

2. The configuration system of claim 1, wherein the one or more higher level elements are units, wherein the first configuration routine is adapted to enable the user to specify the relationships between equipment associated with the one or more units and the second configuration routine is adapted to automatically provide an indication of the equipment associated with the one of more units to the data historian.

3. The configuration system of claim 1, wherein the one or more higher level elements are units, wherein the first configuration routine is adapted to enable the user to specify the relationships between one or more control modules associated with the one or more units and the second configuration routine is adapted to automatically provide an indication of the one or more control modules associated with the one of more units to the data historian.

4. The configuration system of claim 1, wherein the one or more higher level elements are units, wherein the first configuration routine is adapted to enable the user to specify the relationships between one or more control modules and one or more equipment entities associated with the one or more units and the second configuration routine is adapted to automatically provide an indication of the one or more control modules and the one or more equipment entities associated with the one of more units to the data historian.

5. The configuration system of claim 1, wherein the first configuration routine is adapted to enable a user to specify one or more control modules for one of the one or more higher level elements and to download the one or more control modules associated with the one of the higher level elements to the one or more controllers, and wherein the second configuration routine is adapted to send the information to the data historian as a result of the first configuration routine downloading the one or more control modules to the one or more controllers.

6. The configuration system of claim 1, wherein the first configuration routine is adapted to enable a user to make a change to the process control system configuration by specifying a new control module for one of the one or more higher level elements and to download the new control module to the one or more controllers, and wherein the second configuration routine is adapted to send information pertaining to the new control module being associated with the one of the one or more higher level elements to the data historian as a result of the change being made to the process control system configuration.

7. The configuration system of claim 1, wherein the first configuration routine is adapted to enable a user to specify one or more control modules for one of the one or more higher level elements and to store the one or more control modules associated with the one of the one or more higher level elements in a configuration database, and wherein the second configuration routine is adapted to send the information to the data historian as a result of the first configuration routine storing the one or more control modules as being associated with the one of the one or more higher level elements in the configuration database.

8. A process control system for use in a process plant, comprising:
one or more controllers coupled to one or more field devices;
a data historian having a data historian processor and a data historian memory;
a workstation having a workstation processor and a workstation memory;
a communication network communicatively connecting the data historian, the one or more controllers and the workstation;
a first configuration routine stored on the workstation memory and adapted to be executed on the workstation processor to enable a user to specify a configuration of the process control system including enabling a user to specify relationships between the sub-elements and one or more higher level elements within the process control system configuration, and to download changes to the configuration of the process control system to the controllers;
a second configuration routine stored on the workstation memory and adapted to be executed on the workstation processor to automatically provide information pertaining to the sub-elements being associated with the one or more higher level elements within the process control system configuration to the data historian for use by the data historian in storing process data generated during operation of the process control system; and
a configuration list stored in the data historian memory adapted to store the information pertaining to the sub-elements being associated with the one or more higher level elements within the process control system configuration.

9. The process control system of claim 8, wherein the data historian is a batch historian that stores information pertaining to batch runs implemented by the process control system.

10. The process control system of claim 8, wherein the one or more higher level elements are units, wherein the first configuration routine is adapted to enable the user to specify the relationships between equipment associated with one of the one or more units and the second configuration routine is adapted to automatically provide an indication of the equipment associated with the one of the one or more units to the data historian.

11. The process control system of claim 8, wherein the one or more higher level elements are units, wherein the first configuration routine is adapted to enable the user to specify one or more control modules associated with one of the one or more units and the second configuration routine is adapted to automatically provide an indication of the one or more control modules associated with the one of the one or more units to the data historian.

12. The process control system of claim 8, wherein the one or more higher level elements are units, wherein the first configuration routine is adapted to enable the user to specify the relationships between one or more control modules and one or more equipment entities associated with the one or more units and the second configuration routine is adapted to automatically provide an indication of the one or more control modules and the one or more equipment entities associated with the one or more units to the data historian.

13. The process control system of claim 8, wherein the first configuration routine is adapted to enable a user to specify one or more control modules for each of the one or more higher level elements and to download the one or more control modules associated with one of the higher level elements to the one or more controllers, and wherein the second configuration routine is adapted to send the information pertaining to the sub-elements being associated with the one or more higher level elements to the data historian as a result of the first configuration routine downloading the one or more control modules to the one or more controllers.

14. The process control system of claim 8, wherein the first configuration routine is adapted to enable a user to make a change to the process control system configuration by specifying a new control module for one of the one or more higher level elements and to download the new control module to the one or more controllers, and wherein the second configuration routine is adapted to send information pertaining to the new control module being associated with the one of the one or more higher level elements to the data historian as a result of the change being made to the process control system configuration.

15. The process control system of claim 8, further including a configuration database and wherein the first configuration routine is adapted to enable a user to specify one or more control modules for one of the one or more higher level elements and to store the one or more control modules associated with the one of the one or more higher level elements in the configuration database, and the second configuration routine is adapted to send the information pertaining to the sub-elements being associated with the one or more higher level elements to the batch historian as a result of the first configuration routine storing the one or more control modules as being associated with the one of the one or more higher level elements in the configuration database.

16. A method of configuring a process control system having a data historian and having one or more controllers communicatively connected to one or more field devices within a process plant, the method comprising:
enabling a user to specify higher level elements within the process plant which are to be used to perform activities within the process plant;
enabling a user to specify relationships between one or more sub-elements associated with one or more of the higher level elements within the process plant to create a configuration for the process control system for use by the data historian in storing process data generated during operation of the process control system;
downloading changes to the configuration of the process control system to the controllers; and automatically informing the data historian of the sub-elements associated with the one or more higher level elements as a result of the user specifying the one or more sub-elements of the one or more higher level elements.

17. The method of configuring a process control system of claim 16, wherein enabling the user to specify the one or more sub-elements of the one or more higher level elements includes enabling the user to specify the relationships between one or more equipment entities associated with one of the one or more higher level elements and wherein automatically informing the data historian includes automatically informing the data historian of the one or more equipment entities associated with the one of the one or more higher level elements.

18. The method of configuring a process control system of claim 16, wherein enabling the user to specify the one or more sub-elements of the one or more higher level elements includes enabling the user to specify the relationships between one or more control modules associated with one of the one or more higher level elements and wherein automatically informing the data historian includes automatically informing the data historian of the one or more control modules associated with the one of the one or more higher level elements.

19. The method of configuring a process control system of claim 16, wherein enabling the user to specify the one or more sub-elements of the one or more higher level elements includes enabling the user to specify the relationships between one or more equipment entities and one or more control modules associated with the one or more higher level elements and wherein automatically informing the data historian includes automatically informing the data historian of the one or more equipment entities and the one or more control modules associated with the one or more higher level elements.

20. The method of configuring a process control system of claim 16, wherein enabling the user to specify the one or more sub-elements of the one or more of the higher level elements includes enabling the user to specify the relationships between one or more control modules associated with one of the one or more higher level elements, further including downloading the one or more control modules associated with the one of the one or more higher level elements to the one or more controllers, and including automatically sending information pertaining to the one or more control modules associated with the one of the one or more higher level elements to the data historian as a result of the downloading the one or more control modules to the one or more controllers.

21. The method of configuring a process control system of claim 16, wherein enabling the user to specify the one or more sub-elements of the one or more of the higher level elements includes storing the one or more sub-elements as being associated with the one or more of the higher level elements in a configuration database and including automatically informing the data historian of the sub-elements associated with the one or more of the higher level elements to the data historian as a result of the storing the one or more sub-elements as being associated with the one or more of the higher level elements in the configuration database.

* * * * *